United States Patent
Israel et al.

(10) Patent No.: US 12,434,626 B2
(45) Date of Patent: Oct. 7, 2025

(54) DRIVER ASSISTANCE SYSTEM AND METHOD FOR OUTPUTTING EXPANDED WARNING INFORMATION IN THE VEHICLE

(71) Applicant: Bayerische Motoren Werke Aktiengesellschaft, Munich (DE)

(72) Inventors: Boris Israel, Munich (DE); Felix Lauber, Munich (DE); Desiree Meyer, Stockdorf (DE); Frederik Platten, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 18/273,649

(22) PCT Filed: Jan. 13, 2022

(86) PCT No.: PCT/EP2022/050644
§ 371 (c)(1),
(2) Date: Jul. 21, 2023

(87) PCT Pub. No.: WO2022/174997
PCT Pub. Date: Aug. 25, 2022

(65) Prior Publication Data
US 2024/0300412 A1    Sep. 12, 2024

(30) Foreign Application Priority Data
Feb. 22, 2021   (DE) .................. 10 2021 104 080.9

(51) Int. Cl.
*B60Q 9/00* (2006.01)
*B60K 35/23* (2024.01)
(Continued)

(52) U.S. Cl.
CPC ............... *B60Q 9/00* (2013.01); *B60K 35/23* (2024.01); *B60Q 3/74* (2017.02); *G06V 20/597* (2022.01)

(58) Field of Classification Search
CPC .......... B60Q 9/00; B60Q 3/74; G06V 20/597; B60K 35/23
(Continued)

(56) References Cited

U.S. PATENT DOCUMENTS

| | | | |
|---|---|---|---|
| 10,407,077 B2 * | 9/2019 | Offenhaeuser | ....... B62D 15/025 |
| 2014/0159887 A1 * | 6/2014 | Piasecki | ................. B60K 35/00 340/438 |

(Continued)

FOREIGN PATENT DOCUMENTS

| | | |
|---|---|---|
| DE | 10 2008 038 816 A1 | 2/2010 |
| DE | 10 2015 105 581 A1 | 5/2016 |

(Continued)

OTHER PUBLICATIONS

International Search Report (PCT/ISA/210) issued in PCT Application No. PCT/EP2022/050644 dated May 2, 2022 with English translation (5 pages).

(Continued)

*Primary Examiner* — Zhen Y Wu
(74) *Attorney, Agent, or Firm* — Crowell & Moring LLP

(57) ABSTRACT

Methods, systems, and apparatuses for outputting situation-dependent, expanded warning information in a driver assistance system of a vehicle. The driver assistance system outputs situation-contingent, expanded warning information in the vehicle. A registration unit registers an output of warning information in an information-output unit of the vehicle. A sensor ascertains a degree of attentiveness of a driver of the vehicle. An electronic control unit controls an output in the vehicle such that, where a low degree of (Continued)

attentiveness of the driver has been ascertained, the output provides an expanded output of warning information in the vehicle.

4 Claims, 2 Drawing Sheets

(51) Int. Cl.
*B60Q 3/74* (2017.01)
*G06V 20/59* (2022.01)

(58) Field of Classification Search
USPC .......................................................... 340/439
See application file for complete search history.

(56) References Cited

U.S. PATENT DOCUMENTS

| | | | |
|---|---|---|---|
| 2015/0051780 A1* | 2/2015 | Hahne | B60W 10/20 |
| | | | 701/23 |
| 2015/0102929 A1* | 4/2015 | Grinenval | B60K 28/066 |
| | | | 340/576 |
| 2017/0329329 A1 | 11/2017 | Kamhi et al. | |
| 2019/0061772 A1 | 2/2019 | Prinz | |
| 2019/0126820 A1* | 5/2019 | Chien | H04W 4/90 |
| 2021/0016804 A1 | 1/2021 | Hara et al. | |
| 2021/0188162 A1* | 6/2021 | Yoshizawa | B60W 50/16 |
| 2021/0197668 A1* | 7/2021 | Tian | B60K 35/211 |
| 2021/0237743 A1* | 8/2021 | Boström | B60W 40/08 |
| 2021/0403019 A1 | 12/2021 | Kim | |

FOREIGN PATENT DOCUMENTS

| | | |
|---|---|---|
| DE | 10 2015 223 248 A1 | 5/2017 |
| DE | 10 2017 110 283 A1 | 11/2017 |
| DE | 10 2017 220 394 A1 | 5/2019 |
| EP | 3 576 074 A1 | 12/2019 |
| WO | WO 2020/182797 A1 | 9/2020 |
| WO | WO 2020/256177 A1 | 12/2020 |

OTHER PUBLICATIONS

German-language Written Opinion (PCT/ISA/237) issued in PCT Application No. PCT/EP2022/050644 dated May 2, 2022 (6 pages).
German-language Search Report issued in German Application No. 10 2021 104 080.9 dated Oct. 27, 2021 with partial English translation (11 pages).
"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).
"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

* cited by examiner

DRIVER ASSISTANCE SYSTEM AND METHOD FOR OUTPUTTING EXPANDED WARNING INFORMATION IN THE VEHICLE

BACKGROUND AND SUMMARY OF THE INVENTION

The present subject matter relates to a device and a method for outputting situation-contingent, expanded warning information in the vehicle.

In the case where a critical operating situation of a vehicle has been ascertained and/or in the case where a critical driving situation in the vehicle has been ascertained, warning information may be output in the vehicle. For instance, an approach of the vehicle to an object can be ascertained by a parking assistant with the aid of suitable sensor devices such as ultrasonic sensors, for example. In response to the ascertained approach, an appropriate optical and/or acoustic warning signal can be output in the passenger compartment of the vehicle. Also in the case of highly automated or fully automated driving, warning information may be output in the vehicle if, contingent upon the situation, the user of the vehicle has to take over the control of the vehicle (take-over request). For this purpose, warning information maybe output on a display device of the vehicle, for example in the instrument cluster and/or in the head-up display. Some of this warning information may, of course, be absolutely critical, so an immediate registering of this information by the occupant of the vehicle is necessary, so in this case expanded warning information in the vehicle may become necessary. At the same time, a driver of the vehicle and/or other occupants of the vehicle may find it annoying if too many outputs of information in the vehicle take place in unwarranted manner.

The object of the present subject matter consists in providing a solution that, contingent upon the situation, outputs expanded warning information in the vehicle.

In accordance with the present subject matter, this object is achieved by the features of the independent claims. Preferred embodiments are the subjects of the dependent claims.

The aforementioned object is achieved by a driver-assistance system for outputting situation-contingent, expanded warning information in a vehicle, comprising:
  a registration unit that has been configured to register an output of warning information in an information-output unit in the vehicle;
  a sensor that has been configured to ascertain a degree of attentiveness of a driver of the vehicle;
  an electronic control unit that has been configured to control an output in the vehicle in such a manner in the case where a low degree of attentiveness of the driver of the vehicle has been ascertained that an expanded output of warning information in the vehicle by means of the output takes place.

Within the scope of this document, the term "vehicle" encompasses mobile means of transport that serve for the transportation of persons (conveyance of passengers), of freight (freight traffic) or of tools (machines or auxiliary equipment). In particular, the term "vehicle" encompasses motor vehicles and also motor vehicles that can, at least partially, be propelled electrically (electric cars, hybrid vehicles).

The vehicle may be controlled by a vehicle driver. In addition, or as an alternative to this, the vehicle may be a vehicle driving at least partially in automated manner.

Within the scope of this document, the term "vehicle driving in automated manner", or "automated driving", may be understood to mean driving with automated longitudinal or lateral guidance, or autonomous driving with automated longitudinal and lateral guidance. Automated driving may be, for instance, driving on the freeway for a relatively long time, or driving for a limited time within the scope of parking or maneuvering. The term "automated driving" encompasses automated driving with any degree of automation. Example degrees of automation are assisted, partially automated, highly automated or fully automated driving. These degrees of automation were defined by the Bundesanstalt für Straßenwesen [German Federal Highway Research Institute] (BASt) (see BASt publication "Forschung kompakt", Issue 11/2012). In the case of assisted driving, the driver performs the longitudinal or lateral guidance permanently, while the system takes over the respective other function within certain limits. In the case of partially automated driving, the system takes over the longitudinal and lateral guidance for a certain period of time and/or in specific situations, whereby the driver has to monitor the system permanently, as in the case of assisted driving. In the case of highly automated driving, the system takes over the longitudinal and lateral guidance for a certain period of time, without the driver having to monitor the system permanently; but the driver has to be capable of taking over the guidance of the vehicle within a certain time. In the case of fully automated driving, the system can manage the driving automatically in all situations for a specific application; a driver is no longer required for this application. The aforementioned four degrees of automation correspond to SAE Levels 1 to 4 of the SAE J3016 standard (SAE=Society of Automotive Engineering). Furthermore, SAE Level 5 is also provided in SAE J3016 as the highest degree of automation, which is not included in the definition given by the BASt. SAE Level 5 corresponds to driverless driving, in the course of which the system can manage all situations automatically during the entire journey like a human driver.

The vehicle includes a registration unit. The registration unit has been configured to register an output of warning information with respect to warning information in the vehicle.

The output of warning information may relate to any output of warning information in the vehicle. For instance, the output of warning information may comprise one or more of the following outputs of warning information:
  a hands-on request, in the event of which, in an at least partially autonomous driving mode, a driver of the vehicle is invited to place his/her hands on the steering wheel;
  a take-over request, in the event of which, in an at least partially autonomous driving mode, a driver of the vehicle to take over the guidance of the vehicle again;
  a start-up reminder, in the event of which the attention of the driver of the vehicle—including an appropriate driver-assistance system—is drawn to the fact that the traffic signal has switched to green. Such a driver-assistance system registers the switching of the traffic signal with the aid of external sensors and can output an appropriate start-up reminder when the traffic signal switches over to "green", or "permission to drive";
  a safety-status display, for instance if a driver-assistance system of the vehicle fails by reason of weather conditions and/or system failures; and/or
  any other output of warning information in the vehicle.

To each of these outputs of warning information, a suitable output characteristic may have been assigned that comprises a physically measurable property.

The vehicle includes a sensor that has been configured to ascertain a degree of attentiveness of a driver of the vehicle.

The vehicle includes, in addition, an electronic control unit.

If the registration unit registers an output of warning information in the vehicle, and if the sensor ascertains a low degree of attentiveness of the driver of the vehicle, the electronic control unit has been configured to control an output, which is different from the information-output unit, in the vehicle in such a manner that an expanded output of warning information in the vehicle takes place which the driver of the vehicle is able to register despite the ascertained low degree of attentiveness.

Advantageously, an expanded output of warning information in the vehicle can, contingent upon the situation, consequently be output to the driver of the vehicle—that is to say, in the case where an output of warning information is output via the information-output unit in the vehicle but the driver cannot register this output by reason of the ascertained low degree of attentiveness—so that the driver is able to register the warning information at any time.

The information-output unit preferably comprises:
an instrument cluster of the vehicle; and/or
an infotainment system of the vehicle; and/or
a head-up display of the vehicle.

The information-output unit of the vehicle may comprise an instrument cluster of the vehicle, via which the output of warning information takes place, and/or an infotainment system of the vehicle, via which the output of warning information takes place, and/or a head-up display of the vehicle, via which the output of warning information takes place. The information-output unit may include any other systems in the vehicle that have been configured to output warning information in the vehicle—for instance, an acoustic and/or haptic output of warning information.

The sensor preferably comprises a passenger-compartment camera,
the ascertaining of the degree of attentiveness of the driver of the vehicle by the camera comprising the ascertaining of a direction of view of the driver of the vehicle; and
the ascertaining of the low degree of attentiveness of the driver of the vehicle comprising ascertaining a direction of view of the driver of the vehicle turned away from the information-output unit.

The sensor may comprise one or more passenger-compartment cameras that have been configured to register image data in the interior of the vehicle. The passenger-compartment cameras may comprise, for instance, one or more cameras for automatic detection of a direction of view of the driver of the vehicle. The camera(s) for automatic detection of the direction of view of the driver of the vehicle can by using appropriate technical image-analysis systems to carry out. To this end, in particular the position of the information-output unit, via which the output of warning information of the vehicle takes place, can also be taken into account. The sensor can consequently ascertain the low degree of attentiveness of the driver of the vehicle by ascertaining a direction of view of the driver turned away from the information-output unit.

Advantageously, it can consequently be ensured that, contingent upon the situation, an expanded output of warning information in the vehicle takes place if the driver of the vehicle cannot register the output of warning information in the vehicle by reason of a direction of view turned away from the information-output unit. As a result, safety in road traffic is enhanced. At the same time, the situation is avoided where an expanded output of warning information in the vehicle takes place if the driver of the vehicle registers the output of warning information by reason of a direction of view of the driver of the vehicle turned toward the information-output unit. As a result, annoying redundant outputs of warning information in the vehicle are prevented.

The output preferably comprises a passenger-compartment lighting of the vehicle.

The passenger-compartment lighting of the vehicle may comprise any option provided in the vehicle for illuminating the passenger compartment of the vehicle, in particular a passenger-compartment light fixture(s), a background light fixture(s), and/or an ambient light fixture(s). This is particularly advantageous, since the ambient light fixture(s) in the vehicle may be installed throughout the passenger compartment of the vehicle. The expanded output of warning information can consequently take place in any direction of view of the vehicle registered by the sensor. As a result, it is ensured that the driver of the vehicle is able to register the expanded output of information in the vehicle.

The electronic control unit has preferably been configured to control the output in such a manner that the passenger-compartment lighting of the vehicle an expanded output of warning information in the direction of view of the driver of the vehicle ascertained by the camera takes place which corresponds to an output characteristic corresponding to the output of warning information registered by the registration unit.

The output characteristic is a physically measurable property. The physically measurable property may comprise: a color, a color spectrum, a luminous intensity and/or a change in luminous intensity. To each expanded output of warning information an output characteristic may be assigned that corresponds to or has been assigned to the output characteristic of the output of warning information of the information-output unit. For instance, it may have been firmly defined, and/or established by a user of the vehicle, that:
in the event of the output of warning information for a hands-on request, the expanded output of warning information comprises a pulsating orange luminescence;
in the event of the output of warning information for a take-over request, the expanded output of warning information comprises red flashing;
in the event of the output of warning information for a start-up reminder, the expanded output of warning information comprises a change of color from red to green via yellow;
etc.

The aforementioned expanded outputs of warning information are merely example expanded outputs of warning information, which may be modified, arranged and/or expanded at will.

Advantageously, by virtue of the output characteristic of the expanded output of warning information, the driver of the vehicle can consequently register the output characteristic of the output of warning information without having to turn his/her gaze toward this output. Consequently, safety in road traffic is enhanced further.

According to a second aspect, the underlying object is achieved by a method for outputting situation-contingent, expanded warning information in a vehicle, comprising:

registering, via a registration unit, an output of warning information in an information-output unit of the vehicle;

ascertaining, via a sensor, a degree of attentiveness of a driver of the vehicle; and in the case where a low degree of attentiveness of the driver of the vehicle has been ascertained:

controlling, by means of an electronic control unit, an output in the vehicle in such a manner that an expanded output of warning information in the vehicle by means of the output takes place.

The information-output unit preferably comprises:

an instrument cluster of the vehicle; and/or an infotainment system of the vehicle; and/or a head-up display of the vehicle.

The sensor preferably comprises a passenger-compartment camera:

the ascertaining of the degree of attentiveness of the driver of the vehicle by the passenger-compartment camera comprising the ascertaining of a direction of view of the driver of the vehicle; and the ascertaining of the low degree of attentiveness of the driver of the vehicle comprising ascertaining a direction of view of the driver of the vehicle turned away from the information-output unit.

The output preferably comprises a passenger-compartment lighting of the vehicle.

The electronic control unit has preferably been configured the output, the ascertaining of the degree of attentiveness of the driver of the vehicle by the passenger-compartment camera comprising the ascertaining of a direction of view of the driver of the vehicle; and the ascertaining of the low degree of attentiveness of the driver of the vehicle comprising ascertaining a direction of view of the driver of the vehicle turned away from the information-output unit.

These and other objects, features and advantages of the present subject matter will be clarified by studying the following detailed description of preferred embodiments and of the accompanying Figures. It is evident that—although embodiments are described separately—individual features thereof may be combined to form additional embodiments.

DETAILED DESCRIPTION

Figure 1:
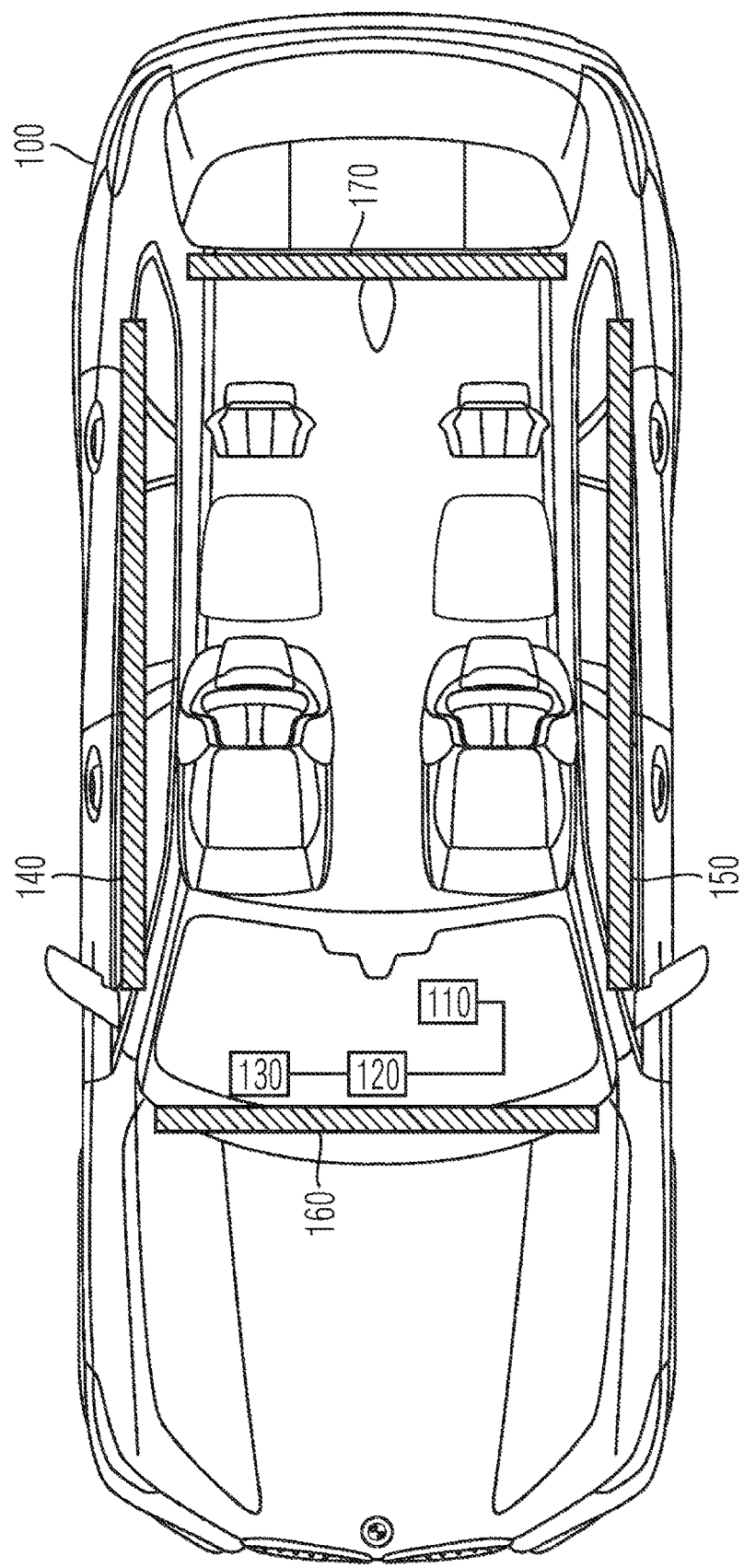
FIG. 1 shows schematically a driver-assistance system for outputting situation-contingent, expanded warning information in a vehicle.

FIG. 1 shows schematically a driver-assistance system for outputting situation-contingent, expanded warning information in a vehicle 100.

The driver-assistance system includes a registration unit 120 that has been configured to register an output of warning information in an information-output unit in the vehicle 100. The output of warning information may relate to any output of warning information in the vehicle 100. For instance, the output of warning information may comprise one or more of the following outputs of warning information:

a hands-on request, in the event of which, in an at least partially autonomous driving mode, a driver of the vehicle 100 is invited to place his/her hands on the steering wheel;

a take-over request, in the event of which, in an at least partially autonomous driving mode, a driver of the vehicle 100 to take over the guidance of the vehicle 100 again;

a start-up reminder, in the event of which the attention of the driver of the vehicle 100—including an appropriate driver-assistance system—is drawn to the fact that the traffic signal has switched to green. Such a driver-assistance system registers the switching of the traffic signal with the aid of external sensors, and can output an appropriate start-up reminder when the traffic signal switches over to "green", or "permission to drive";

a safety-status display, for instance if a driver-assistance system of the vehicle 100 fails by reason of weather conditions and/or system failures; and/or any other output of warning information in the vehicle 100.

To each of these outputs of warning information, a suitable output characteristic may have been assigned that comprises a physically measurable property.

The information-output unit of the vehicle 100 may comprise an instrument cluster of the vehicle 100, via which the output of warning information takes place, and/or an infotainment system of the vehicle 100, via which the output of warning information takes place, and/or a head-up display of the vehicle 100, via which the output of warning information takes place. In addition, or as an alternative to this, the information-output unit may include any other systems in the vehicle 100 that have been configured to output warning information in the vehicle 100—for instance, an acoustic and/or haptic output of warning information. The output of warning information comprising the suitable output characteristic can be output via the information-output unit in a conventional manner.

The system includes a sensor 110 that has been configured to ascertain a degree of attentiveness of the driver of the vehicle 100.

The sensor 110 may comprise one or more passenger-compartment cameras that have been configured to register image data in the interior of the vehicle 100. The passenger-compartment cameras may comprise, for instance, one or more cameras for automatic detection of a direction of view of the driver of the vehicle 100. The camera(s) for automatic detection of the direction of view of the driver of the vehicle 100 can by using appropriate technical image-analysis systems to carry out. For this purpose, in particular the position of the information-output unit, via which the output of warning information of the vehicle takes place, can also be taken into account. Consequently, the sensor 110 can ascertain a low degree of attentiveness of the driver of the vehicle by ascertaining a direction of view of the driver turned away from the information-output unit.

The system includes, in addition, an electronic control unit 130.

If the registration unit 120 registers an output of warning information in the vehicle 100 and if the sensor 110 ascertains a low degree of attentiveness of the driver of the vehicle 100, the electronic control unit 130 has been configured to control an output 140, 150, 160, 170, which is different from the information-output unit, in the vehicle 100 in such a manner that an expanded output of warning information in the vehicle 100 takes place which the driver of the vehicle 100 is able to register despite the ascertained low degree of attentiveness.

The output 140, 150, 160, 170 may comprise a passenger-compartment light of the vehicle 100. The passenger-compartment light of the vehicle 100 may comprise any option provided in the vehicle 100 for illuminating the passenger compartment of the vehicle, in particular a passenger-compartment light fixture(s), a background light fixture(s), and/or an ambient light fixture(s). This is particularly advantageous, since the ambient light fixture(s) in the vehicle 100 may be installed throughout the passenger compartment of the vehicle. The expanded output of warning information can consequently take place in any direction of view of the vehicle 100 registered by the sensor. As a result, it is ensured that the driver of the vehicle 100 is able to register the expanded output of information in the vehicle 100.

Advantageously, it can consequently be ensured that an expanded output of warning information in the vehicle 100 takes place via the output 140, 150, 160, 170 if the driver of the vehicle 100 cannot register the output of warning information in the vehicle 100 by reason of a direction of view turned away from the information-output unit. As a result, safety in road traffic is enhanced. At the same time, the situation is avoided where an expanded output of warning information in the vehicle 100 by means of the output 140, 150, 160, 170 takes place if the driver of the vehicle 100 registers the output of warning information by reason of a direction of view of the driver of the vehicle 100 turned toward the information-output unit. As a result, annoying redundant outputs of warning information in the vehicle 100 are prevented.

The electronic control unit 130 may configured to control the output 140, 150, 160, 170 in such a manner that the output 140, 150, 160, 170 of the vehicle 100 an expanded output of warning information in the direction of view of the driver of the vehicle 100 ascertained by the sensor 110 takes place which corresponds to an output characteristic corresponding to the output of warning information registered by the registration unit 120.

The output characteristic is a physically measurable property. The physically measurable property may comprise: a color, a color spectrum, a luminous intensity and/or a change in luminous intensity. To each expanded output of warning information an output characteristic may be assigned that corresponds to or has been assigned to the output characteristic of the output of warning information of the information-output unit. For instance, it may have been firmly defined, and/or established by a user of the vehicle, that:

- in the event of the output of warning information for a hands-on request, the expanded output of warning information comprises a pulsating orange luminescence;
- in the event of the output of warning information for a take-over request, the expanded output of warning information comprises red flashing;
- in the event of the output of warning information for a start-up reminder, the expanded output of warning information comprises a change of color from red to green via yellow;
- etc.

The aforementioned expanded outputs of warning information are merely example expanded outputs of warning information, which may be modified, arranged and/or expanded at will.

Advantageously, the driver of the vehicle 100 can consequently register the output characteristic of the output of warning information by virtue of the output characteristic of the expanded output of warning information without having to turn his/her gaze toward the information-output unit. Consequently, safety in road traffic is enhanced further.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

Figure 2:
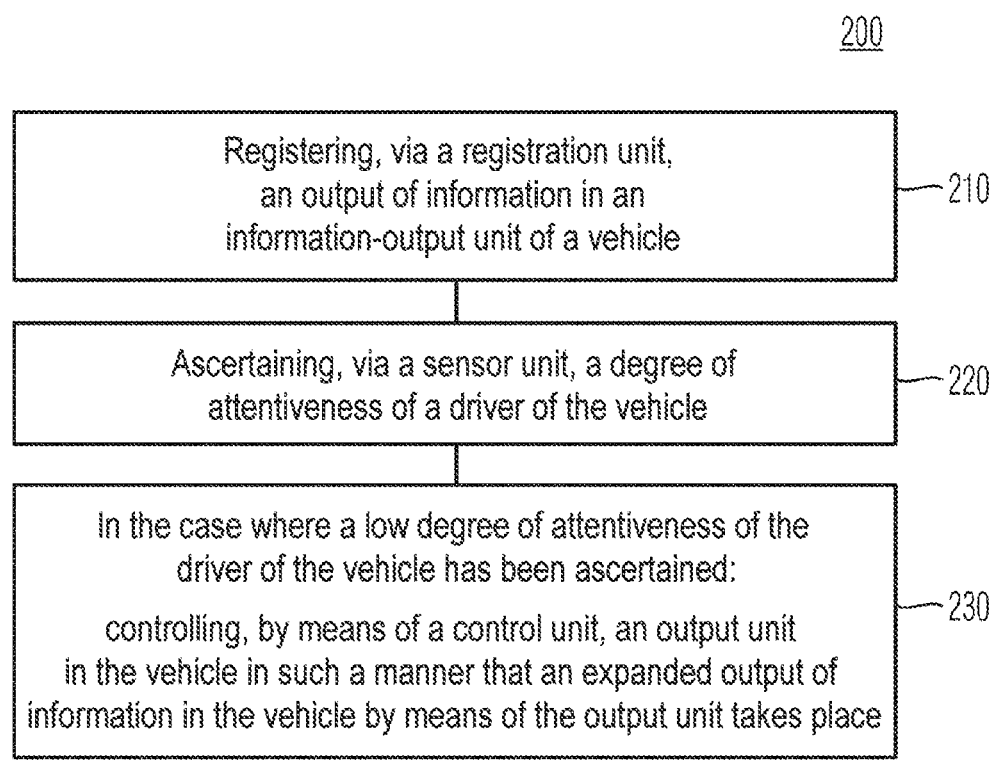
FIG. 2 shows an example method for outputting situation-contingent, expanded warning information in a vehicle.

FIG. 2 shows a computer-implemented method 200 for outputting situation-contingent, expanded warning information in a vehicle 100, which can be executed by a driver-assistance system as described with reference to FIG. 1.

The method 200 comprises:
- registering 210, via a registration unit 120, an output of warning information in an information-output unit of the vehicle 100;
- ascertaining 220, via a sensor 110, a degree of attentiveness of a driver of the vehicle 100; and
- in the case where a low degree of attentiveness of the driver of the vehicle 100 has been ascertained:
- controlling 230, by means of an electronic control unit 130, an output 140, 150, 160, 170 in the vehicle 100 in such a manner that an expanded output of warning information in the vehicle 100 by means of the output 140, 150, 160, 170 takes place.

The information-output unit may comprise:
- an instrument cluster of the vehicle 100; and/or
- an infotainment system of the vehicle 100; and/or
- a head-up display of the vehicle 100.

The sensor 110 may comprise a passenger-compartment camera:
- the ascertaining 220 of the degree of attentiveness of the driver of the vehicle 100 by the passenger-compartment camera comprising the ascertaining of a direction of view of the driver of the vehicle 100; and
- the ascertaining of the low degree of attentiveness of the driver of the vehicle 100 comprising ascertaining a direction of view of the driver of the vehicle 100 turned away from the information-output unit.

The electronic control unit 130 may have been configured to control the output 140, 150, 160, 170 in such a manner that the passenger-compartment light of the vehicle 100 an expanded output of warning information in the direction of view of the driver of the vehicle 100 ascertained by the passenger-compartment camera takes place which corresponds to an output characteristic corresponding to the output of warning information registered by the registration unit 120.

The invention claimed is:

1. A driver-assistance system for outputting situation-contingent, expanded warning information in a vehicle, comprising:

a registration unit configured to register an output of warning information in an information-output unit in the vehicle;

a sensor configured to ascertain a degree of attentiveness of a driver of the vehicle; and an electronic control unit configured to control an output in the vehicle such that, where a low degree of attentiveness of the driver has been ascertained, the output provides an expanded output of warning information in the vehicle, wherein the sensor comprises a passenger-compartment camera, the degree of attentiveness of the driver by the passenger-compartment camera is ascertained based on a direction of view of the driver, the low degree of attentiveness of the driver is ascertained based on a direction of view of the driver turned away from the information-output unit, the output comprises a passenger-compartment light of the vehicle, the electronic control unit is further configured to control the passenger-compartment light of the vehicle to provide an expanded output of warning information in a direction of view of the driver and ascertained by the passenger-compartment camera, and the expanded output of warning information corresponds to an output characteristic corresponding to the output of warning information registered by the registration unit.

2. The driver-assistance system according to claim 1, wherein the information-output unit comprises:

an instrument cluster of the vehicle;

an infotainment system of the vehicle; and/or a heads-up display of the vehicle.

3. A computer-implemented method for outputting situation-contingent, expanded warning information in a vehicle, comprising:

registering, via a registration unit, an output of warning information in an information-output unit of the vehicle;

ascertaining, via a sensor, a degree of attentiveness of a driver of the vehicle; and where a low degree of attentiveness of the driver has been ascertained, controlling, using an electronic control unit, an output in the vehicle to provide an expanded output of warning information in the vehicle, wherein the sensor comprises a passenger-compartment camera, the ascertaining of the degree of attentiveness of the driver by the passenger-compartment camera comprises ascertaining of a direction of view of the driver, the ascertaining of the low degree of attentiveness of the driver comprises ascertaining a direction of view of the driver turned away from the information-output unit, the output comprises a passenger-compartment light of the vehicle, the electronic control unit is configured to control the passenger-compartment light of the vehicle to provide an expanded output of warning information in a direction of view of the driver and ascertained by the passenger-compartment camera, and the expanded output of warning information corresponds to an output characteristic corresponding to the output of warning information registered by the registration unit.

4. The method according to claim 3, wherein the information-output unit comprises:

an instrument cluster of the vehicle;

an infotainment system of the vehicle; and/or a heads-up display of the vehicle.

* * * * *